United States Patent [19]

Moineau et al.

[11] Patent Number: 5,402,812
[45] Date of Patent: Apr. 4, 1995

[54] TIMED WATER CONTROL SHOWER VALVE, SYSTEM AND METHOD

[75] Inventors: Hubert J. Moineau, Bolton, Mass.; Alve Erickson, Milford; John S. Howland, Danville, both of N.H.

[73] Assignee: Automatic Specialties, Inc., Marlboro, Mass.

[21] Appl. No.: 262,553

[22] Filed: Jun. 20, 1994

[51] Int. Cl.⁶ .......................... B05B 1/30; F16K 31/48
[52] U.S. Cl. ................................... 137/1; 137/624.12; 137/636.4; 137/556; 239/70
[58] Field of Search .............. 137/624.12, 624.11, 137/624.18, 624.22, 552.7, 553, 556, 624.2, 627.5, 628, 630.2, 630.16, 630.17, 636, 636.1, 636.4, 614.11, 1; 239/70; 251/111, 113

[56] References Cited

U.S. PATENT DOCUMENTS

| | | | |
|---|---|---|---|
| 3,542,331 | 11/1970 | Canalizo | 251/113 X |
| 3,638,682 | 2/1972 | Meyer et al. | 137/624.12 |
| 4,194,535 | 3/1980 | Galland et al. | 137/636.4 |
| 4,230,155 | 10/1980 | Frye, Sr. et al. | |
| 4,345,621 | 8/1982 | Dunckhorst | |
| 4,494,556 | 1/1985 | Sinclair et al. | 137/556 |
| 4,502,506 | 3/1985 | Fisher | 137/624.12 |
| 4,867,189 | 9/1989 | Moineau | |
| 4,921,209 | 5/1990 | Moineau | |

*Primary Examiner*—Martin P. Schwadron
*Assistant Examiner*—Kevin L. Lee
*Attorney, Agent, or Firm*—Richard P. Crowley

[57] ABSTRACT

A timed water control valve system for use with a shower, which comprises a valve body within a housing having a water flow passage with a water inlet for a source of water and a water outlet for a device to dispense water, which water flow is to be time controlled. The valve body includes first, second and third spool passageways, with the three spools therein tensionally positioned in their respective spool passageways and adapted to move slidably between a water flow position and a non-water flow position. A timer having a rotatable shaft is connected to a knob which on rotatable movement activates the timer to a preselected water flow time period for the flow of water. The knob is also moved between an inward, water non-activated position and an outward, water activated position; first and second cams about the shaft and between the timer and knob permit the rotation of the knob. A third spool can be selectedly moved slidably between a position to interrupt the preselected water flow time period of the timer and a timer non-stop position; and the first and second cams are arranged so that the user cannot select an additional selected water flow time period until the first cam is placed by the timer in a selected cam alignment with the second cam. A color coded timing indicator extends outwardly from the housing and is connected to the first cam to indicate the water flow condition within the water control valve apparatus.

26 Claims, 7 Drawing Sheets

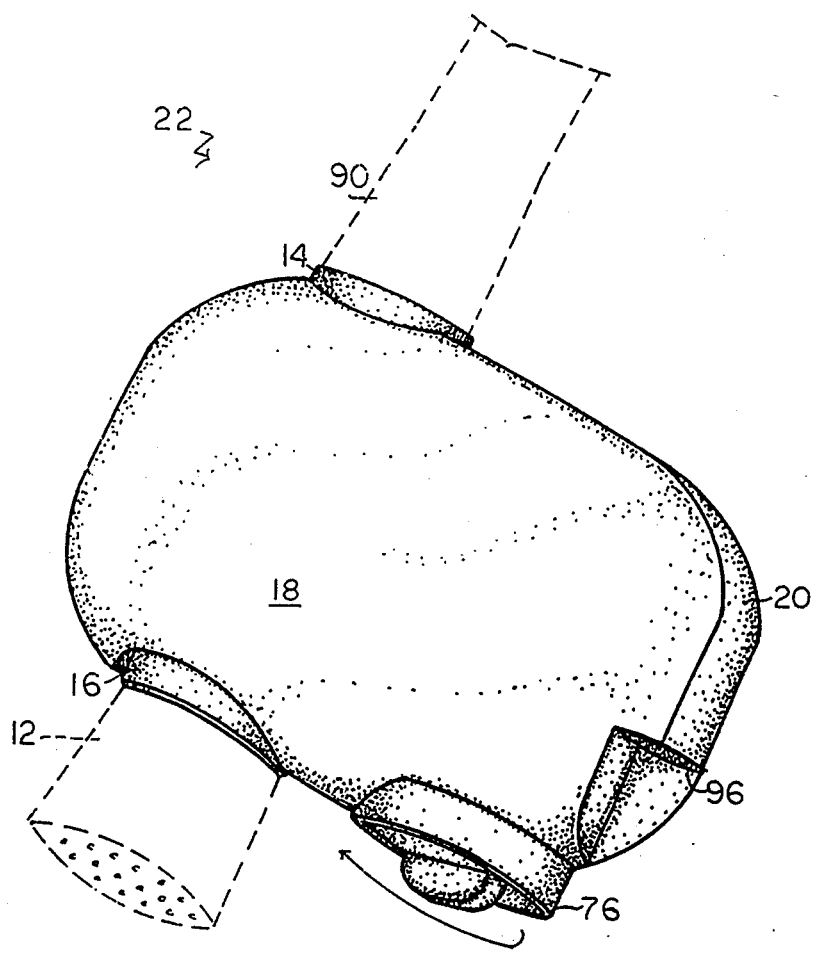
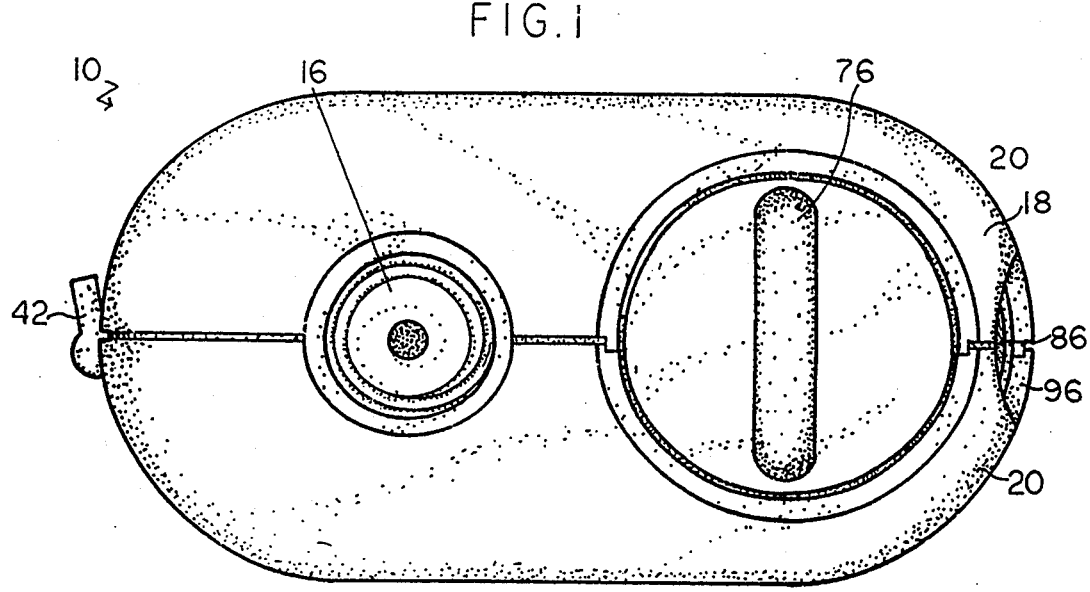
FIG. 1
FIG. 2

TIMED WATER CONTROL SHOWER VALVE, SYSTEM AND METHOD

BACKGROUND OF THE INVENTION

It is increasingly desirable to conserve water use in a domestic environment, such as water use or shower and bathroom washing operations. There is a wide variety of water control valves, particularly for controlling the flow of water through a water shower valve, which is typically disposed between a water supply pipe and the shower head of a bathroom shower, which are directed to the conservation of water, such as by limiting the flow rate of water through the valve. Other water control shower valves are designed to limit the time of water flow, alone or in conjunction with limiting the amount of water flow. Such water control shower valves may be operated mechanically or by tension-wound springs, or by operation of electrical motors or solenoids.

For example, U.S. Pat. No. 4,230,155, issued Oct. 28, 1980, directed to a water control valve includes an actuator shaltable between an on and off position, spring-biased toward the off position. The shower valve is constructed to provide or an initial actuation of the valve to allow or water to flow therethrough for a predetermined time period and then the valve automatically terminates the flow of shower water for a predetermined time period during which the person taking the shower cannot continue the washing operation after the time interval has been completed. The person taking the shower again actuates the water control valve to cause water to flow through the water control valve for a second time flow period in which-the person may rinse.

U.S. Pat. No. 4,345,621, issued Aug. 24, 1982, is directed to a timed shower head valve conserving water used in a shower, which valve structure provides a timed cycle allowing water flow for a preset time period, wherein the system includes a rotating ball on a valve chamber, with the ball being grooved and ported to control the flow of water with the rotation of the ball controlled by a manually set spring operated timer, which is wound to set the correct time.

U.S. Pat. No. 4,867,189 issued Sep. 19, 1989, and its divisional patent, 4,921,209 issued May 1, 1990, are directed to a shower water control valve wherein the length of time a person can use a shower is controlled by a pair of timers in the solenoid operated valve, wherein a first timer controls the length of time water flows through the shower and another timer prevents the solenoids being energized for a predetermined time period after the first timer has turned the water off, thus preventing the shower from being turned on again until the designated time period has elapsed. The water control valve requires a valve body and first and second solenoids, which solenoids are generally positioned at opposite ends or coaxially with a longitudinal axis of the valve body, which are actuated by a dry cell battery.

It is desirable to provide for a new and improved water control valve, system and method, particularly for a shower, which control valve may be easily and effectively mechanically operated by a user and which control valve provides for a desirable water flow for a preselected time period, and yet permits the bather to interrupt the water flow during operation, and then on completion of the water flow time period then prevents the user from actuating the water control valve for a preselected time period.

SUMMARY OF THE INVENTION

The invention relates to a timed water control valve, a system employing the valve and a method for the timed control of the flow of water, and particularly to a shower valve control system.

The invention relates to a timed water control valve, system and method which provides for a user to select a water flow control time period by employing a knob which operates a control valve with a timer, and which includes a cam mechanism so that further control of the knob, which operates the valve, cannot turn the water on again for a predetermined amount of time, forcing the water user to complete the use of the water in the time allotted by the preselected time control valve. The water control device optionally and preferably has a water control override activation system whereby the user may pause the timer and interrupt the preselected water flow time period, but only during the preselected time period, to provide for additional time for washing without exceeding the preselected time flow period; however, once the preselected time period has elapsed, then the user may not activate the valve of the control means to reactivate the flow of water until a predetermined amount of time has elapsed.

The time control valve, system and method of the invention thus provides numerous advantages over the prior art systems, particularly as adapted for the employment of a water control valve and system, employing a shower head as the timed water flow control device, and provides in a preferred embodiment for a mechanical timer, such as a coil or spring-wound timing device containing a balance wheel, which avoids the difficulty associated with the use of battery-operated electrical timers, which are subject to failing due to the continuous presence of moisture.

The invention relates to a timed water control valve, which may or may not be also limited in water flow rate, which valve comprises a housing, typically a two-part housing, comprising an upper and lower housing secured together, and a valve body within the housing having a straight, aligned water flow passage with a longitudinal axis and the valve body having a water inlet adapted to be placed in water flow communication with the source of water, such as a normal water supply, and a water outlet to be placed in water flow communication with a device that dispenses water, for which the water flow is to be time controlled, or more particularly, for example, a shower head.

The valve body includes first, second and third spool passageways arranged generally perpendicular to the axis of the water flow passageways and with first, second and third spools each having a one and an other end, a thin, reduced, cross-sectional area to provide for the flow of water, and a full cross-sectional area to provide for the prevention of the flow of water, with the spools tensionally positioned, such as by being spring-biased, in respective first, second and third spool passageways. The spools each are adapted to move slidably between the water control position to permit the flow of water in the water flow passageway and a non-water flow position to prevent the flow of water in the water flow passageway.

The control valve also includes a timer having a rotatable shaft extending outwardly therefrom to operate the timer, and typically the timer comprising a spring or coil-wound, tension-mounted timer, which also would include a vibrating or rotating balance wheel therein, which mechanically wound-type timers are readily commercially available, as sold by M. H. Rhodes Inc. in Avon, Conn. designed to provide on rotation of the shaft a selected time period. The valve also includes a cam mechanism typically positioned about the shaft and to provide a first cam, particularly a rotary cam with an arcuate-type raised ridge on one surface and two spaced-apart holes, generally of different size, on the cam inside the ridge, so that on rotation of the cam mechanism the knob timer may be positioned to the preselected water flow time period and a non-timed, nonactivated water flow position.

The cam mechanism also includes a second cam and a cam surface with two spaced-apart fingers, generally of different size, adapted to engage the one end of the first and second spools to permit the aligned, slidable movement of the first and second spools in the respective first and second flow passageways to permit the flow of water for a preselected flow time period when the knob is moved to a water-activated timing position. The control valve includes a knob positioned on the outer surface of the outer cam mechanism about the shaft adapted, on the employment of the cam mechanism by rotational movement, to activate the timer to a preselected water flow time period which has been predetermined for the flow of water in the water flow passageway. The knob is mounted on the outer cam and is adapted to move rotatably and axially from the shaft between an inwardly, untimed, water nonactivated position and an outwardly disposed, timed, water activating position.

The valve also includes a mechanism to move slidably the third spool, optionally at the selection of the user, who moves the mechanism, for example, by the use of a pivot means extending outwardly from the housing between a position to interrupt the preselected water flow and time period in the system, so as to permit the user optionally to pause and thereby extend the preselected water flow time period as desired, to soap and wash the user's hair and body without unnecessarily using up the water flow time period, but only during the preselected water flow and time period. The cam mechanism is arranged so that on rotation of the knob to the non-activated position, the first cam mechanism is moved to activate the timer and then the knob is moved axially outward to the timed water activating position to disengage the first cam mechanism from the second cam mechanism, with the second cam mechanism having a pair of raised fingers thereon, which are adapted to selectly fit into the holes of the first cam mechanism, which first and second cam mechanism are so arranged so that the user may not re-engage the first and second cam mechanism during the preselected water flow and non-water flow time period to change the selected water flow time period.

The timed water flow control valve optionally and preferably includes a visual indicator to indicate to the user the water flow and non-water flow positions, and optionally and preferably a cautionary time notice that the water flow will stop at a predesignated time period. Generally, the visual indicator would include a color-coded system, such as red, green and yellow, and can be placed on the outer periphery of one surface of the first cam mechanism, and which outer surface extends through the housing of the water control valve so that it is visible to the user.

In the timed control valve of the invention, the first and second spools are in varying contact with a cam surface of the first and second cam mechanisms, to provide for the slidable movement of the first and second spools, typically by a rotatable movement of the second cam mechanism to a position whereby the first and second spools are moved between a water flow and a non-water flow position, while the third spool may be moved, such as by a pivot type lever, from its biased position into contact with the spring-wound balance wheel on the mechanical timer to stop the balance wheel and therefore stop the winding down of the mechanical coil of the timer, therefore suspending the preselected water time period initiated by the user by the rotation of the knob, and then by movement of the pivot mechanism to another position, the preselected water flow time period is again initiated to wind out to the end of the preselected water flow time period and subsequent non-water flow time period. The third spool is placed within the housing to permit the operation of the timer, so that the third spool is placed in an open, water flow position.

In operation, the knob on the outer cam is pushed in and engaged with the inner or first cam mechanism by means of the two fingers of unequal size on the outer cam mechanism engaging with the two selectedly aligned holes on the inner cam mechanism, and turned, such as clockwise, to stop at a predetermined position, so that at this point the timer is wound up and ready to begin the mechanically timed cycle, and with the third spool in the open, water flow position, the first spool in the closed, non-water flow position resting against the outer vertical surface of the outer cam mechanism, and the second spool positioned against an arcuate ridge located on the outside of the inner cam mechanism, said ridge being of a selected size to correspond with the preselected time of the desired water flow time period, so that the water has not started to flow within the axially aligned flow passageway.

The movement of the knob assembly on the outer or second cam mechanism axially outwardly puts the first spool to the open position, and the second spool is held open by the arcuate ridge surface of the first, inner cam mechanism, with the third spool remaining in the open water flow position. At this point, the timer begins the mechanically timed cycle, with the arcuate ridge on the inner cam mechanism rotating with the spring-wound timer for the preselected time period. The water, when the knob is moved to the outward, water flow activated position, is now operational, and water is flowing for the preselected water time period.

A visual time indicator is employed, for example, on the outer surface outside of the arcuate ridge on the inner cam mechanism, which time indicator is painted on the face and visible to the user, which would then show green for a water flow condition. During operation, at any time during the preselected water flow time period, such as the shower cycle, both the flow of water can be interrupted and the timer can be paused by moving the pivot switch to a different position, allowing the third spool to move into contact with the balance wheel or otherwise to stop the timing mechanism, for example, to allow for extra time for the user for soaping and washing. The operation of the third spool to extend the time can be repeated as many times as necessary while the green water flow and yellow cautionary time period shows on the visual indicator, without the loss of any actual shower water flow time. In the water flow or operational position all of the first, second and third spools are in the open or water flow position, while the timer is set to operate for the predetermined amount of time, for example, five to fifteen minutes, or any other time designated by the manufacturer.

At some preselected timing mark, such as 1 to 2 minutes prior to the end of the preselected water flow time period, the visual indicator changes from green to a cautionary color, such as yellow, for warning the user that there is approximately so much time left, for example, one minute of water flow time left, based on the preselected time period. When the warning time has elapsed, the arcuate ridge on the outer surface of the inner cam that has been retaining the second spool in the water flow position ends, and the second spool closes and the indicator on the outer part on the first cam mechanism changes from yellow to red, indicating the completion of the water flow timer period and the water flow, and during the remaining non-water flow time period the knob cannot be re-engaged to restart the operation until the timing mechanism has wound down to the initializing position.

When the second spool closes, it shuts the water flow off, providing thereon an additional predetermined period of time, as selected by the manufacturer, for example, one to ten minutes, in which selected time period the knob cannot be re-engaged to start the timing cycle again because the first or second cam mechanisms are not aligned so that the spaced-apart fingers of the second cam mechanism may be inserted in the spaced-apart holes of the first cam mechanism until the spring-wound timing mechanism unwinds to the initializing position, thus preventing re-engagement of the operation of the mechanical timer. Thus, once the selected time period for water flow expires, or the water is shut off and the timed control valve cannot be turned on again for a predetermined amount of time, as the knob cannot be re-engaged between the first and second cam mechanisms until the timing mechanism winds down to the initializing position, thus forcing the user to complete the timed use of water in the time allotted by the preselected time period of the control valve. After the timing mechanism has completely wound down and returned to the initializing position, the user can rewind the timed control valve system if an additional water flow time period is desired.

The invention will be described and illustrated in use in certain embodiments; however, it is recognized that various additions, changes, modifications and improvements may be made to the illustrated embodiments without departing from the spirit and scope of the invention.

BRIEF DESCRIPTION OF DRAWINGS

FIG. 1 is a perspective view of the front and bottom of a timed water control valve system of the invention;

FIG. 2 is a bottom plan view of the timed water control valve of the invention;

DESCRIPTION OF THE EMBODIMENTS

Figure 3:
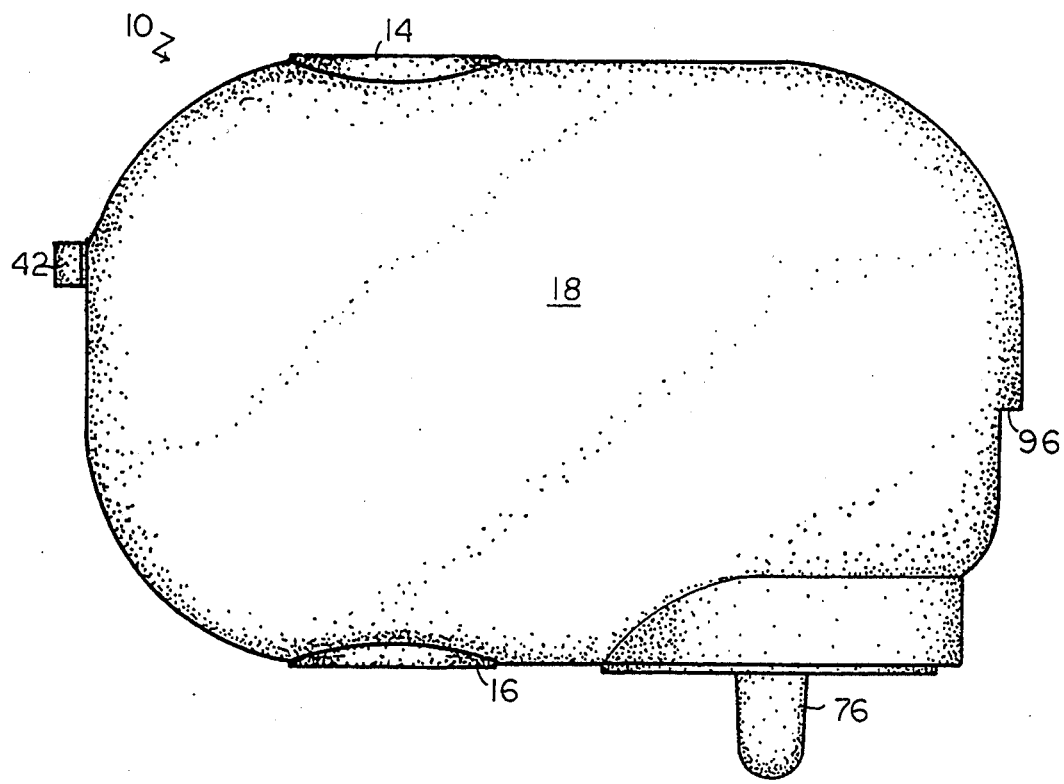
FIG. 3 is a front plan view of the invention of FIG. 1
Figure 4:
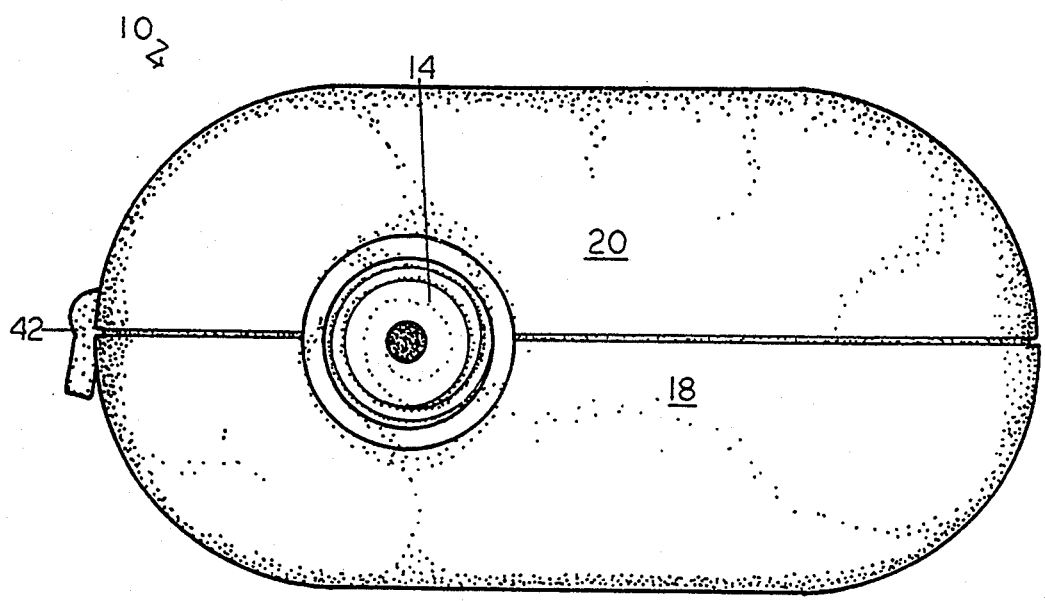
FIG. 4 is a top plan view of the invention of FIG. 1.
Figure 5:
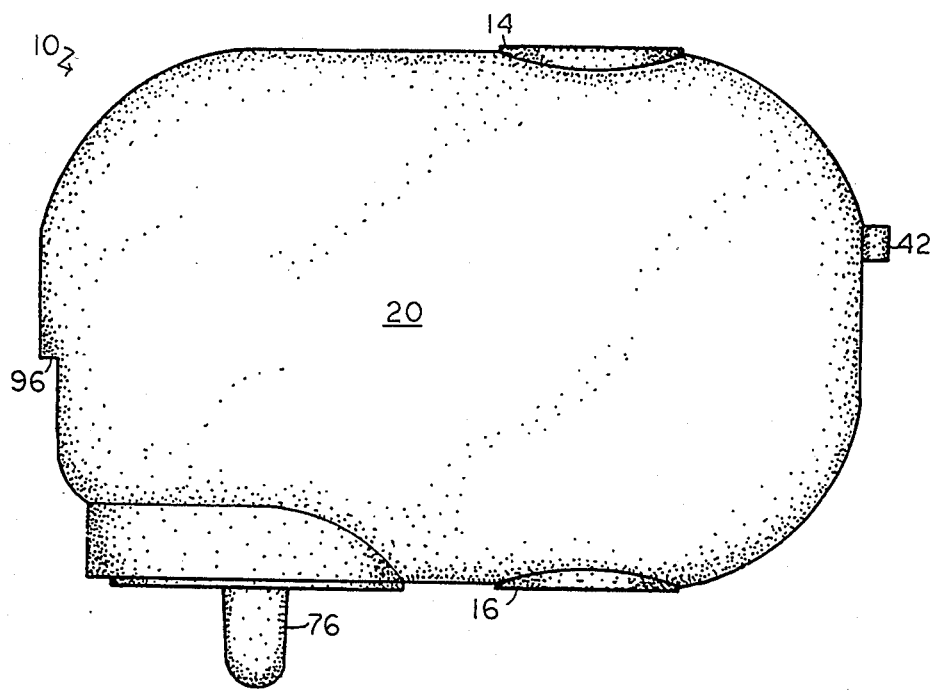
FIG. 5 is a back plan view of the invention of FIG. 1.
Figure 6:
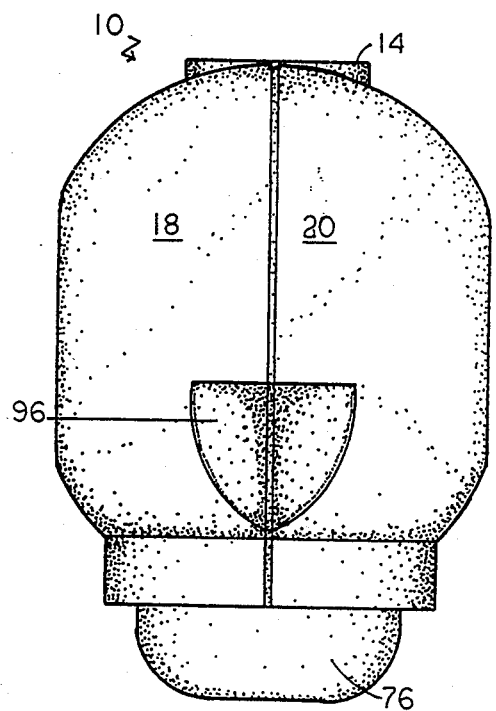
FIG. 6 is a side plan view of the invention of FIG. 1.
Figure 7:
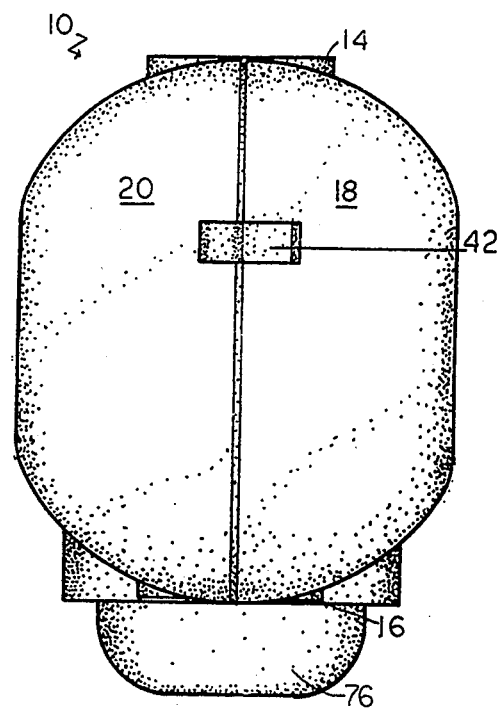
FIG. 7 is a side plan view of the other side of the invention of FIG. 1.

With particular reference to FIGS. 1 through 7, there is shown a water control valve system 22 with a water inlet 14 attached to a water source 90 and having a water dispenser such as a shower head 12, attached to the water outlet 16, the inlet 14 and outlet 16 being of a threaded type; wherein the timed control valve housing 10 has an upper housing cover 18 and a lower housing cover 20 secured together. The valve housing 10 includes a control knob 76, illustrated by arrows for clockwise movement, and the valve housing 10 on one side includes an indented housing opening 96 and a color indicator 86 as hereinafter described, and on the opposite side includes a pivotably operated control lever 42.

FIGS. 8 through 12 illustrate in sectional view the timed water control valve 10 of the invention in the various positions during the operation of the timed control valve, showing the timed water control valve housing 10 with the water inlet 14 having valve threads 98, an inlet-outlet valve body passageway 24, and a water outlet 16, also having valve threads 98. The valve has first 26, second 28 and third 30 spool openings arranged generally perpendicularly to the axis of the water flow passageway, the first, second and third spools openings respectively having spools 55, 46 and 32 having a one and an other end, with spool springs 56, 48 and 34 on the one end toward the outside of the housing and spool bumpers 58, 50 and 36 on the other end, reduced cross sections 60, 52 and 38 to provide for the flow of water through the water inlet-outlet valve and a full cross section 62, 54 and 40 to prevent the flow of water through the water inlet-outlet valve. Each of the full and reduced cross sections on the first, second and third spools are positioned differently to provide for the different functions of the mechanism during use.

The timing mechanism 100 is comprised of a spring wound timer mechanism 68, a balance wheel 72, and a timer shaft 70, which is secured to the inner cam means 64. The inner cam means 64 includes a circular portion 75 with a timing indicator 86 on the outer edge, and an arcuate ridge 74 of a length extending 90° to 180° around the circumference of the circular portion facing the outer cam 66, and two selectedly spaced-apart holes 82 and 84, one hole being smaller 84 and the other hole being larger 82 provided for the fit of the larger 78 and smaller 80 fingers of the outer cam mechanism 66. (In FIG. 8, the fingers and holes are shown in dotted lines, their actual positions as illustrated and described herein on the two cams being 90° from the illustrated position, but which fingers may be placed anywhere on the inner cam as desired by the manufacturer). The outer cam mechanism includes, with the fingers, a curved outer surface 88, which engages the first and second spool bumpers when the inner and outer cams are being engaged. A knob 76 is secured to the outer cam 66 for rotating of the outer cam to wind the spring-wound timing mechanism of the timed control shower valve. A control lever 42 for the third spool 32 is contained by the outer housing top and bottom covers 18 and 20 and a lever holder housing 44 within the outer perimeter of the outer housing.

Figure 8:
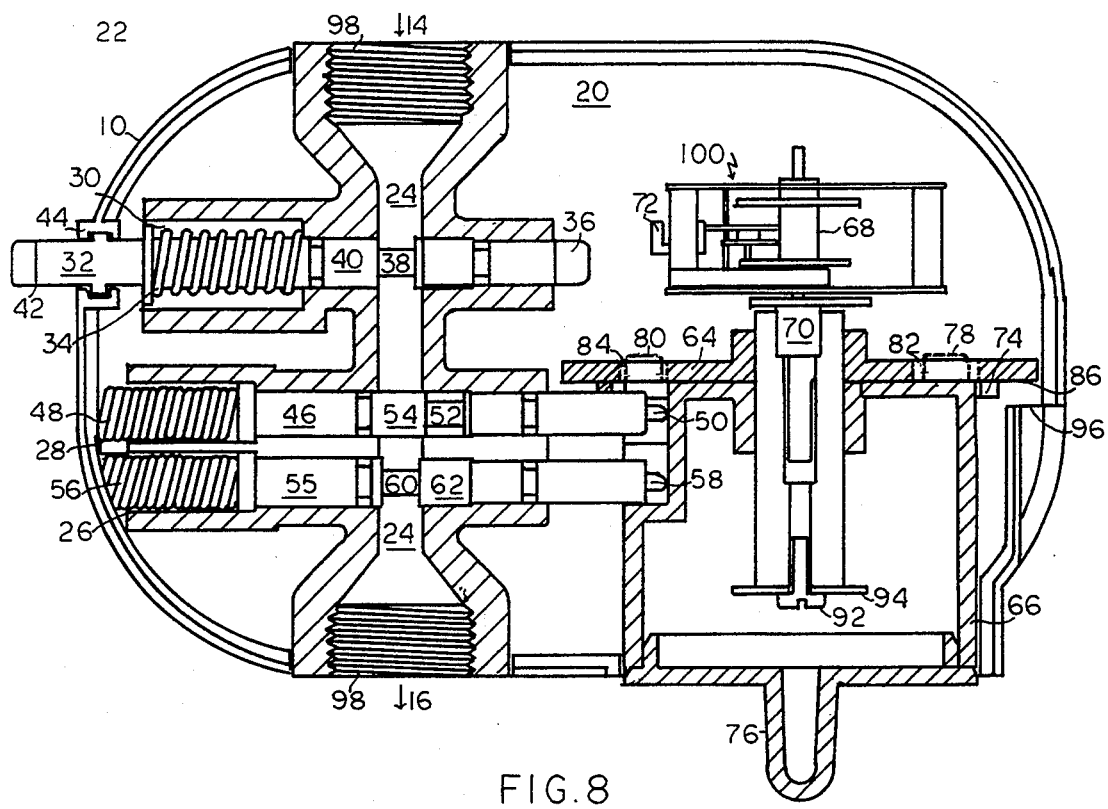
FIG. 8 is a sectional view of the timed water control valve of the invention shown in a non-wound, non-activated, non-use position.

FIG. 8, as illustrated, shows the timed shower control valve in a non-wound, nonactivated position with the second spool 46 having the full cross sectional section 54 blocking the valve passageway 24 in a closed, non-water flow position. First and second spools 55 and 46 are resting against the curved section 88 of the outer cam 66 in preparation to be wound and activated.

Figure 9:
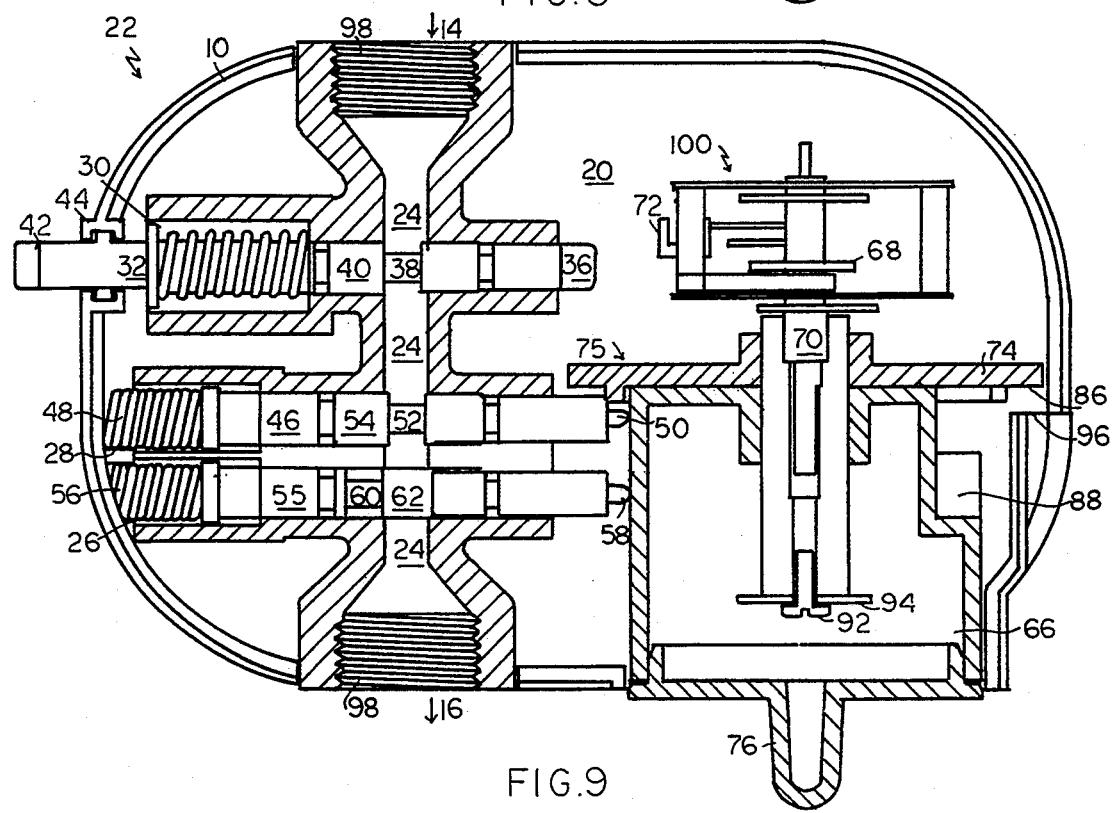
FIG. 9 is a sectional view of the invention shown in a wound, non-activated position.

In FIG. 9, the timed water control valve is shown in the wound, non-activated position with the knob 76 on the outer cam mechanism 66 engaged with the inner cam mechanism 64, rotated to wind the timing mechanism 100. At this point, the arcuate ridge 74 is engaged with the second spool 46 to retain it in an open position with the reduced cross section aligned in the valve passageway 24 to allow for the flow of water through spool 46; the first spool 55 is engaged with the outer cam mechanism and retained in a non-water flow position, and the third spool 32 is in the open, water flow position.

Figure 10:
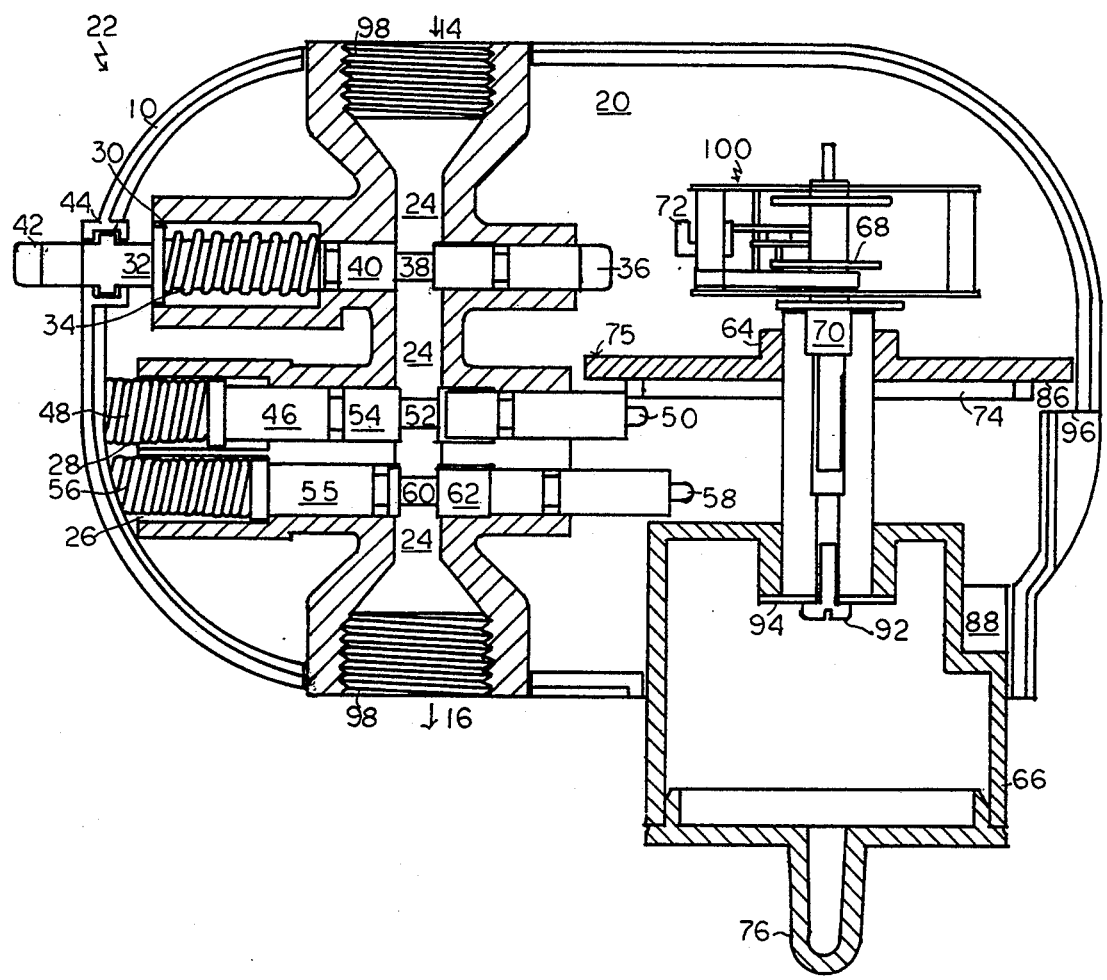
FIG. 10 is a sectional view of the invention shown in a wound, activated, use position.

FIG. 10 illustrates the water control valve 10 in the open, water flow, timer activated position, with the knob 76 and the outer cam mechanism 66 moved by the user axially outwardly to release the first spool 55, placing the spool in an open, water flow position by positioning the first spool reduced cross section 60 in the valve passageway to allow for flow of water through the valve. At this point, the timing mechanism 100 is activated by the release of the inner cam 64 by moving the outer cam 66 axially outwardly, thereby disengaging the two spaced-apart fingers 78 and 80 in the outer cam 66 from their aligned position in the holes 82 and 84 on the inner cam mechanism 64. The water flow time period has now commenced with all three spools in the open, water flow position and the spring-wound timing mechanism unwinding according to a predesignated time period.

Figure 11:
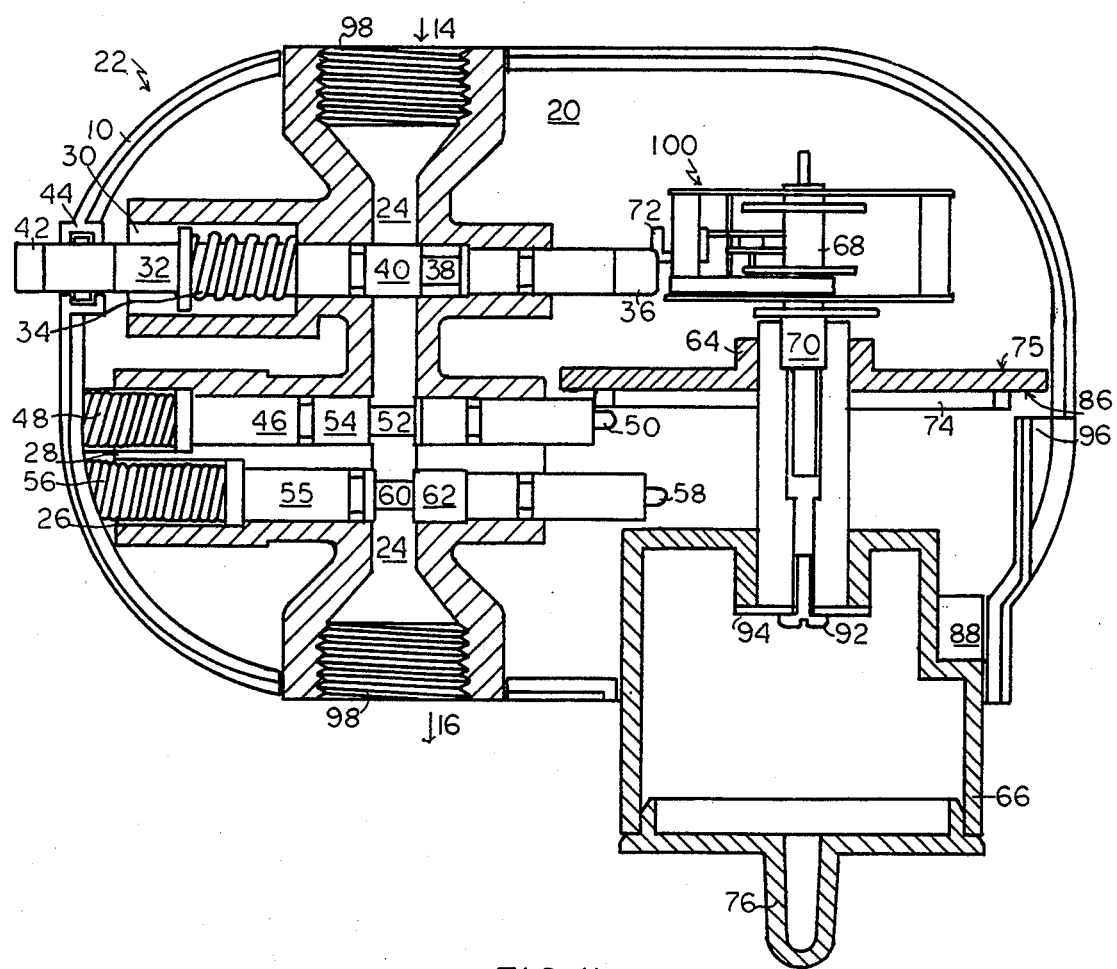
FIG. 11 is a sectional view of the invention shown in an activated, water flow pause position.

FIG. 11 shows the valve control system in the water flow pause period, with the first and second spools 55 and 46 in the open, water flow position and the third spool 32 moved inwardly by the pivotable lever 42 to engage the third spool bumper 36 with the balance wheel 72, thus preventing the spring-wound timing mechanism 100 from winding down further, providing an interruption of the water flow time period wherein the user may wash or lather as desired without losing the water flow time. The lever 42 can then be pivotably moved to release the balance wheel from the third spool bumper, thereby recommencing the movement of the spring-wound timer and the water flow time period.

Figure 12:
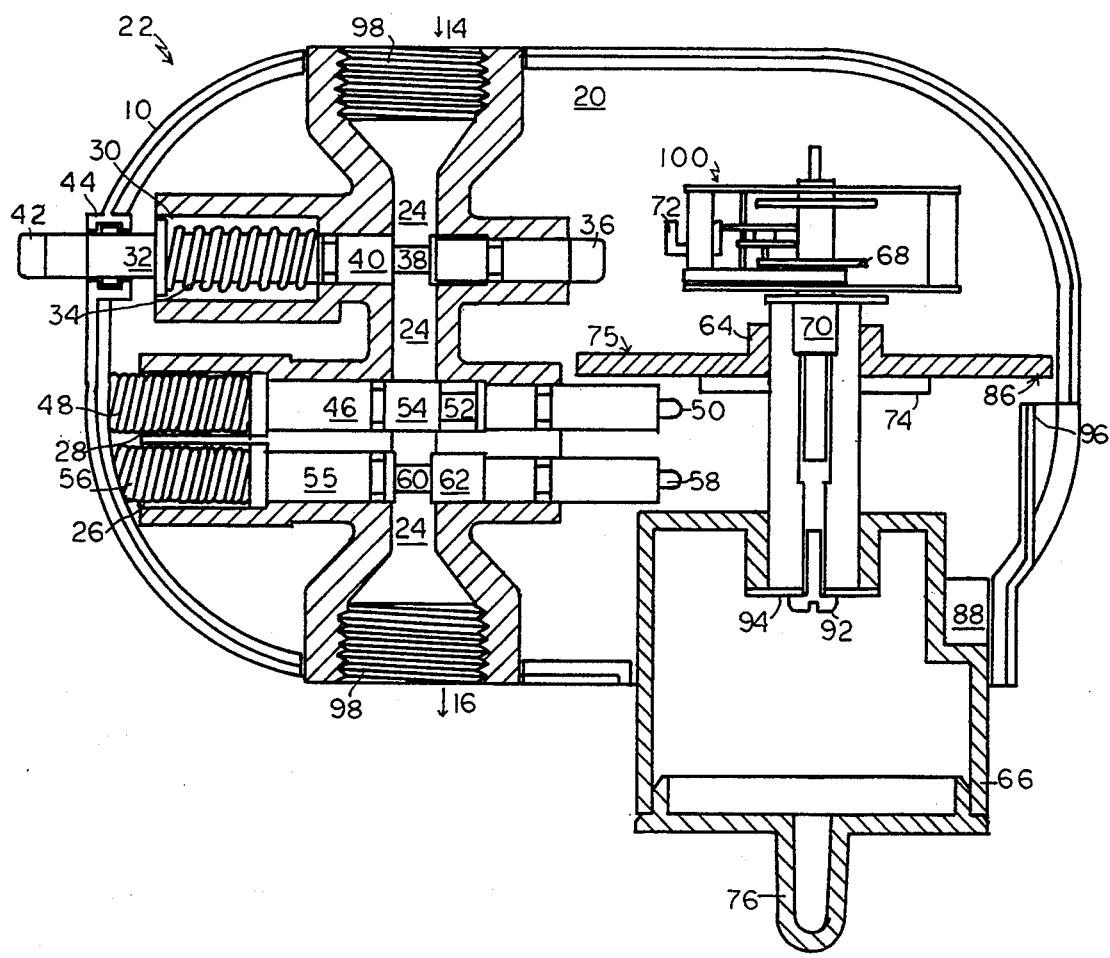
FIG. 12 is a sectional view of the invention shown in the post-shower, non-water flow position.

FIG. 12 illustrates the water control valve of the invention in the completed water flow time period, wherein the arcuate ridge 74 has terminated due to the winding down of the timing mechanism, thus causing the second spool 46 to move into the closed, non-water flow position, blocking the valve passageway 24 with the second spool full cross section 54. At this point, the preselected non-water flow time period has yet to expire, preventing the first and second cam mechanisms from being re-engaged to initiate the water flow time period for another preselected water flow time period.

What is claimed is:

1. A timed water control valve which comprises:
   a) a housing;
   b) a valve body within the housing and having a water flow passage with a longitudinal axis with a water inlet adapted to be placed in water flow communication with a source of water and a water outlet adapted to be placed in water flow communication with a device to dispense water, which water flow is to be time controlled;
   c) the valve body including first, second and third spool passageways arranged generally perpendicular to the axis of the water flow passageway; and first, second, and third spools each having a one and other end, the spools tensionally positioned in their respective spool passageways and adapted to move slidably between a water flow position to permit the flow of water in the water flow passageway and a non-water flow position to prevent the flow of water in the water flow passageway;
   d) a timer having a rotatable shaft extending outwardly therefrom;
   e) a knob means about the shaft and adapted on rotatable movement to activate the timer to a preselected water flow time period for the flow of water in the water flow passageway, the knob means adapted to move axially about the shaft between an outward water activated position and an inward water non-activated position;
   f) cam means about the shaft and between the timer and knob means, a first cam means to permit the rotation of the timer and the first cam means to position the timer to the preselected water flow time period in the non-activated position, and a second cam means having a cam surface against the one end of the first and second spools to permit the slidable movement of the first and second spools to permit the flow of water for the selected water flow time period when the knob means is moved to the water activated position;
   g) timing means on the first cam means to retain for a preselected time period the second spool in an open water flow position for the preselected time period;
   h) means to interrupt the water flow and the preselected time period of the timer by the user to interrupt optionally the preselected water flow time period and the water flow, and a timer non-stop position; and
   i) the first and second cam means so arranged so that the user cannot place the knob means in a position with the first cam means to select an additional selected water flow time period until the first cam is returned by the timer to its initial position.

2. The valve of claim 1 wherein the first, second and third spools have a reduced cross sectional section to permit the flow of water in the water flow passageway and a full cross sectional section to prevent the flow of water in the water flow passageway.

3. The valve of claim 1 which includes a visual indicator means to indicate to a user the flow of water, non-flow of water, and a cautionary notice of the non-flow of water.

4. The valve of claim 3 wherein the visual indicator means employs a color code system.

5. The valve of claim 3 wherein the visual indicator means is located on an outer edge of the first cam means, which cam means extends outwardly from the housing.

6. The valve of claim 1 wherein the first and second spools are spring tension biased in a generally parallel, spaced-apart arrangement with the one end of each spool in contact with a cam surface of the second cam means for slidable movement of the first and second spools, with the rotatable movement of the second cam means.

7. The valve of claim 1 wherein the timing means comprises a raised, arcuate ridge on a one surface of the first cam means to retain the one end of the second spool in the open water flow position, the length of the arcuate ridge determining the preselected water flow time period.

8. The timing means of claim 7 wherein the arcuate ridge has an arc of about 90° to 180° in length.

9. The timing means of claim 7 wherein the timing means is on an outer surface of the first cam means and provides a preselected water flow time period of 5 to 15 minutes.

10. The valve of claim 1 wherein the timer comprises a mechanically spring wound coil timer having a balance wheel means.

11. The valve of claim 1 wherein the one end of the third spool is moved against the balance wheel means to stop the further timing movement of the timer on activation by the user of the means to move the third spool.

12. The valve of claim 1 wherein the first cam means is secured for rotatable movement with the shaft and the second cam means is secured to the knob means for axial and rotatable movement therewith.

13. The valve of claim 1 wherein a one face surface of the first cam means includes at least two spaced-apart holes; and the second cam means includes two spaced-apart fingers adapted to fit within the spaced apart holes only when the preselected non-water flow time period of the timing means has terminated.

14. The valve of claim 13 wherein the two spaced-apart fingers are of unequal size and are adapted to fit snugly within corresponding spaced-apart holes of the first cam means.

15. The valve of claim 13 wherein the two spaced-apart holes are of unequal size to prevent the user from reinserting the fingers until the selected time period on the timer has been terminated.

16. The valve of claim 12 wherein the second cam means has a first and a second differently curved cam surfaces respectively for slidable movement of the first and second spools.

17. The valve of claim 1 wherein the means to move slidably the third spool includes a pivotable lever means at the other end of the third spool and extending outside the housing for movement by the user between a timer stop position and a timer non-stop position.

18. The valve of claim 1 wherein the water flow passageway is a straight, axially aligned passageway.

19. In combination, a water control system which comprises the valve of claim 1 and a water shower head secured to the outlet of the valve.

20. The system of claim 19 which includes a source of water secured to the water inlet of the valve.

21. A method for the timed control of water flow, which method comprises:
a) providing a water flow passage with a longitudinal axis in a valve body having a water inlet, and placing the inlet in water flow communication with a source of water, and placing a water outlet in water flow communication with a device to dispense water, which water flow being time controlled;
b) providing first, second and third spool passageways in the valve body and arranged generally perpendicular to the axis of the water flow passageway; and first, second, and third spools each having a one and other end, the spools tensionally positioned in their respective spool passageways and moving slidably the spools between a water flow position permitting the flow of water in the water flow passageway and a non-water flow position preventing the flow of water in the water flow passageway;
c) providing a timer having a rotatable shaft extending outwardly therefrom;
d) moving the shaft with a rotatable knob and cam means for activating the timer to a preselected water flow time period for the flow of water in the water flow passageway by positioning an arcuate, raised ridge on the outer surface of the inner cam means to retain the second spool in an open, water flow position, and moving the knob axially about the shaft between an inward, timed, non-water activated position and an outward, timed water nonactivated position;
e) rotating of the knob to set the preselected water flow time period in the timed nonactivated position, and moving the knob axially outwardly into a water-activated water flow position;
f) moving slidably the third spool at the selection of the user into a position to stop operation of the timer and the preselected water flow time period and permitting the user to interrupt the water flow to the selected water flow time period as desired; and
g) arranging the position of the cam means so that the user cannot place the timer knob in a position for selecting an additional selected water flow time period until the two cam means are placed in a selected alignment, with the timer thereby providing for the timed, controlled flow of water with optional interruption of the time period by a user during the preselected water flow time period, but with the inability of the user to recommence the preselected water flow time period after termination for a predetermined time.

22. A water control valve which comprises:
a) a housing;
b) a valve body within the housing and having a water flow passage with a longitudinal axis with a water inlet adapted to be placed in water flow communication with a source of water and a water outlet adapted to be placed in water flow communication with a device to dispense water, which water flow is to be time controlled;
c) the valve body including first, second and third spool passageways arranged generally perpendicular to the axis of the water flow passageway; and first, second, and third spools each having a one and other end, the spools tensionally positioned in their respective spool passageways and adapted to move slidably between a water flow position to permit the flow of water in the water flow passageway and a non-water flow position to prevent the flow of water in the water flow passageway;
d) a mechanical, coiled spring timer;
e) knob means to wind the timer to a preselected water flow time period, and to move between a water flow activation and a non-water flow activation position;
f) cam means to provide for the slidable movement of the first and second spools into a water flow position during the preselected water flow time period and a non-water flow position after the preselected time period;

g) pivotable means optionally by a user to move slidably the third spool between a water flow position and an interrupted water flow position, wherein the preselected water flow time period of the timer is interrupted to permit the continued flow of water; and h) visual indicating means visible to the user to provide information relative to the time period of water flow and non-flow.

23. The valve of claim 22 wherein the means to move the third spool comprises a pivotable lever extending outwardly from the housing for use by the user in moving the third spool.

24. The valve of claim 22 wherein the cam means includes an arcuate ridge of a predetermined length to set the preselected water flow time period.

25. The valve of claim 22 wherein the cam means include first and second cam surfaces, the first cam surface having spaced-apart, raised fingers and the second cam surface having spaced-apart holes adapted to receive the raised fingers, whereby the user may not commence the preselected water flow time period for a separate predetermined time.

26. The valve of claim 22 wherein the visual indicator means extends outwardly from the housing and is connected to the cam means and is color coded.

* * * * *